United States Patent
Tynderfeldt et al.

(10) Patent No.: US 8,411,664 B2
(45) Date of Patent: Apr. 2, 2013

(54) RANDOM ACCESS PREAMBLE COLLISION DETECTION

(75) Inventors: Tobias Tynderfeldt, Solna (SE); Magnus Lindström, Spånga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 274 days.

(21) Appl. No.: 12/741,502

(22) PCT Filed: Nov. 5, 2008

(86) PCT No.: PCT/SE2008/050647
§ 371 (c)(1),
(2), (4) Date: May 5, 2010

(87) PCT Pub. No.: WO2009/061255
PCT Pub. Date: May 14, 2009

(65) Prior Publication Data
US 2010/0220713 A1    Sep. 2, 2010

Related U.S. Application Data
(60) Provisional application No. 60/985,335, filed on Nov. 5, 2007.

(51) Int. Cl.
*H04W 56/00* (2009.01)
*H04J 3/06* (2006.01)

(52) U.S. Cl. .................... 370/350; 455/422.1

(58) Field of Classification Search .......... 370/350; 455/422.1, 69, 67
See application file for complete search history.

(56) References Cited

U.S. PATENT DOCUMENTS

| | | | |
|---|---|---|---|
| 5,479,409 A | 12/1995 | Dupuy et al. | |
| 5,509,035 A * | 4/1996 | Teidemann et al. | 375/356 |
| 5,588,043 A * | 12/1996 | Tiedemann et al. | 455/435.1 |
| 5,668,804 A * | 9/1997 | Suonvieri | 370/331 |
| 5,711,003 A * | 1/1998 | Dupuy | 455/436 |
| 5,771,454 A * | 6/1998 | Ohsawa | 455/452.2 |
| 5,802,465 A * | 9/1998 | Hamalainen et al. | 455/403 |
| 5,950,127 A * | 9/1999 | Nitta et al. | 455/428 |
| 6,038,448 A * | 3/2000 | Chheda et al. | 455/436 |
| 6,167,248 A * | 12/2000 | Hamalainen et al. | 455/403 |

(Continued)

FOREIGN PATENT DOCUMENTS
WO    WO 00/74420    12/2000

OTHER PUBLICATIONS
International Preliminary Report on Patentability mailed May 20, 2010 in corresponding PCT Application No. PCT/SE2008/050647.

(Continued)

*Primary Examiner* — Mark Rinehart
*Assistant Examiner* — Kenneth P Hunt
(74) *Attorney, Agent, or Firm* — Nixon & Vanderhye, P.C.

(57) ABSTRACT

A method (500) for a user terminal (120, 130) in a cellular system (100). The user terminal (120, 130) applies (505) a timing advance to transmissions to a controlling node (140). The user terminal (120, 130) requests (510) communication with the controlling node (140) by a special message (MSG 1), in response to which the user terminal (120, 130) receives (515) a message (MSG 2) which includes an updated value for the timing advance. The user terminal (120, 130) compares (520) the updated value with the value of the timing advance that the user terminal had prior to the reception of said response message. If the difference ($\Delta$) between the prior value and the updated value is greater than a first predetermined threshold ($T_1$) or below a second predetermined threshold ($T_2$), the user terminal (120, 130) ignores (525) the response message (MSG 2) and renews its request for communication.

19 Claims, 6 Drawing Sheets

U.S. PATENT DOCUMENTS

| | | | |
|---|---|---|---|
| 6,470,057 B1* | 10/2002 | Hui et al. | 375/294 |
| 6,625,132 B1* | 9/2003 | Boettger et al. | 370/329 |
| 6,633,559 B1 | 10/2003 | Asokan et al. | |
| 6,738,638 B1* | 5/2004 | Moulsley | 455/517 |
| 6,785,548 B2* | 8/2004 | Moulsley et al. | 455/450 |
| 6,804,212 B1* | 10/2004 | Vallstrom et al. | 370/331 |
| 6,823,187 B2* | 11/2004 | Hamabe | 455/454 |
| 6,909,760 B2* | 6/2005 | Borowski et al. | 375/367 |
| 7,072,628 B2* | 7/2006 | Agashe et al. | 455/140 |
| 7,146,135 B2* | 12/2006 | Agin | 455/69 |
| 7,171,165 B2* | 1/2007 | Azman et al. | 455/69 |
| 7,209,463 B2* | 4/2007 | Park et al. | 370/335 |
| 2002/0080749 A1* | 6/2002 | Terry | 370/336 |
| 2003/0045320 A1* | 3/2003 | Tanno et al. | 455/522 |
| 2005/0195791 A1* | 9/2005 | Sung et al. | 370/342 |
| 2005/0282568 A1* | 12/2005 | Keerthi | 455/502 |
| 2006/0256709 A1* | 11/2006 | Yang | 370/206 |
| 2007/0004416 A1* | 1/2007 | Nishimura et al. | 455/442 |
| 2007/0149206 A1* | 6/2007 | Wang et al. | 455/450 |
| 2007/0161374 A1* | 7/2007 | Kienstra et al. | 455/436 |
| 2007/0206531 A1* | 9/2007 | Pajukoski et al. | 370/329 |
| 2007/0248182 A1* | 10/2007 | Copetti et al. | 375/289 |
| 2007/0254656 A1* | 11/2007 | Dalsgaard | 455/435.1 |
| 2009/0141701 A1* | 6/2009 | Dalsgaard | 370/350 |
| 2009/0209248 A1* | 8/2009 | Lee et al. | 455/422.1 |
| 2012/0014371 A1* | 1/2012 | Weng et al. | 370/350 |

OTHER PUBLICATIONS

International Search Report for PCT/SE2008/050647, mailed Apr. 1, 2009.

Written Opinion of the International Searching Authority for PCT/SE2008/050647, mailed Apr. 1, 2009.

* cited by examiner

RANDOM ACCESS PREAMBLE COLLISION DETECTION

This application is the U.S. national phase of International Application No. PCT/SE2008/050647 filed 2 Jun. 2008, which designated the U.S. and claims the benefit of U.S. Provisional Application No. 60/985,335 filed 5 Nov. 2007, the entire contents of each of which are hereby incorporated by reference.

TECHNICAL FIELD

The technology disclosed herein discloses a method and a device for use in a user terminal in a cellular communications system.

BACKGROUND

In the forthcoming cellular system known as LTE, Long Term Evolution, the downlink transmissions, i.e. transmission to the users in a cell, will use so called OFDM modulation, Orthogonal Frequency Division Multiplex, while the uplink transmissions, i.e. transmission from the users in a cell, will use either OFDM or OFDM-like technologies, such as DFTS-OFDM, a transmission technology which allows for orthogonal multiple access in time as well as in frequency.

Transmissions to and from users in a cell are made to/from a controlling node of the cell, this node in LTE being known as the eNodeB, "evolved NodeB". Users in an LTE system are sometimes referred to as UEs, "User Equipment".

In order to preserve the orthogonality needed in an LTE system, transmissions from the UEs in a cell need to be time aligned when they arrive at the eNodeB, i.e. the transmissions from the UEs in the cell of the eNodeB need to arrive more or less simultaneously at the eNodeB.

Since the different UEs in a cell may be located at different distances from the eNodeB of the cell, the UEs need to initiate their transmissions at different points in time in order for their transmissions to arrive simultaneously at the eNodeB. For example, a UE which is at the cell edge needs to start its transmissions prior to a UE which is closer to the eNodeB.

The issue of when to start the transmissions in the different UEs in a cell can be handled by means of a so called "timing advance", in other words an "offset" value in time at which a UE needs to start its transmissions relative to a nominal transmission time specified by the eNodeB.

The value of the timing advance for a UE can be determined by the eNodeB by means of measuring the arrival of uplink transmissions from the UE, and the eNodeB then transmits the timing advance value to the UE with regular updates, since the UE may move around in the cell.

If a UE does make any transmissions for a period of time, the timing advance needed by the UE becomes uncertain, for example due to possible movement away from the eNodeB of the UE. In order to avoid unaligned UE transmissions, there is therefore typically in an LTE system a timer in both the eNodeB and the UE, which determines when a UE falls "out of synchronization" in uplink. Thus, if a UE has not received a new timing advance command from its eNodeB during a specified period of time, the UE will consider itself out of synchronization.

A UE which is out of synch and needs to initiate communication with its eNodeB will avail itself of a procedure known as Random Access, a procedure which is used in a number of cases, such as, for example:
  Resynchronization,
  Incoming handover,
  Scheduling request (for a UE that is not allocated any other resource for contacting the base station),
  Initial access, for UEs in the LTE_IDLE or LTE_DETACHED states.

One of the Random Access procedures defined for LTE systems is a so called contention based procedure, which can be described briefly as follows:

The UE starts the Random Access procedure by randomly selecting one of the preambles available for contention-based random access, and then transmits the selected random access preamble on the physical random access channel, PRACH, to the eNodeB.

The eNodeB acknowledges reception of the preamble by transmitting a response message, which includes a timing advance value update to be used in future transmissions from the UE. Following this, the eNodeB transmits a second message which is in part used to trigger the establishment of radio resource control, and in part to uniquely identify the UE.

A problem can arise during the Random Access procedure if more than one UE happens to select one and the same preamble and transmit at the same time, or rather, if the transmissions arrive simultaneously at the eNodeB. In such a case, the eNodeB will resolve the conflict by transmitting a so called contention resolution message, which informs the UEs of which one of them has "won" the contention based procedure, and may thus communicate with the eNodeB.

However, although the contention conflict will be resolved in the manner described above, a problem will remain: a subsequent message, which is transmitted by the UE, will be sent before the contention resolution message, and thus, a number of such messages may be sent by different UEs, all with the same resources and with the same so called demodulation reference signal.

Due to this, the eNodeB is likely to arrive at an inaccurate channel estimate, particularly if the signals from the different UEs are approximately of equal strength. With an inaccurate channel estimate, the likelihood of correctly decoding the second message from the different UEs will decrease significantly, which in turn can lead to a situation in which all of the UEs involved need to restart the random access procedure with a new preamble.

SUMMARY

Thus, as has emerged from the description above, there is a need for a solution to the situation in which multiple contending UEs have initiated a request for communication with their eNodeB, and have used the same preamble. Preferably, the solution should reduce the risk of more than one UE continuing the contention based procedure after the eNodeB has transmitted the response message to the request for communication from the UEs.

Such a solution is offered by the technology disclosed herein in that it discloses a method for use in a user terminal in a cellular communications system.

According to the method of the technology disclosed herein, the user terminal applies a timing advance to its transmissions to a controlling node, and the user terminal may request communication with the controlling node by means of a special message, in response to which the terminal receives a response message which includes an updated value for the timing advance.

Also, according to the method, the user terminal compares the updated value for the timing advance with the value of the timing advance that the user terminal had prior to the reception of said response message. If the difference between the prior value and the updated value is greater than a first predetermined threshold or is below a second predetermined threshold, the user terminal ignores the response message and renews its request for communication.

The reasoning behind this principle is as follows: if the difference between the updated timing alignment and the timing alignment which the UE had prior to the reception of the response message is above or below certain limits or thresholds, it is highly likely that the measurements in the eNodeB which led to the calculation of the updated timing alignment value were performed on transmissions from another UE, and that the UE with the excessive difference is thus is not the one for which the update is intended, in other words, it is not the UE which "won" the contention, and should thus "drop out" of the contention as early as possible, and should instead re-start the procedure.

Since the UE drops out of the contention, the problem of multiple UEs responding to the contention response message from the eNodeB can be significantly reduced.

In one embodiment of the technology disclosed herein, the first and the second thresholds have the same absolute value, but with different signs, so that the second threshold corresponds to the first threshold, but has a negative value.

Also, in one embodiment of the method of the technology disclosed herein, the thresholds are provided to the user terminal by the controlling node in question, and in one version of this embodiment, it is provided in a system information message.

In addition, in one version of the technology disclosed herein, the thresholds are provided in a broadcast message from the controlling node.

In an alternative embodiment of the technology disclosed herein, the thresholds are used by all user terminals in the system, i.e. the value is a system standard value.

In a special embodiment of the technology disclosed herein, the user terminal renews its request for communication a certain predefined number of times, and if the difference between the prior value and the updated value exceeds the first threshold or falls below the second threshold during these requests, the user terminal will discard the prior value and use the updated value.

These and other embodiments and advantages of the technology disclosed herein will be described in more detail in the following.

The technology disclosed herein also discloses a user terminal for use in system in which the technology disclosed herein is applied.

BRIEF DESCRIPTION OF THE DRAWING

The technology disclosed herein will be described in more detail in the following, with reference to the appended drawings, in which.

DETAILED DESCRIPTION

The technology disclosed herein will in the following be described with the use of terminology from the LTE system, Long Term Evolution, also known as E-UTRAN, Evolved Universal Terrestrial Radio Access Network. It should however be emphasized that this is done in order to facilitate the reader's understanding, and should not be construed as limiting the scope of protection sought for the technology disclosed herein, which can be applied to other cellular systems in which the same problems arise. Also, the background will be discussed briefly again in this section of the text before turning to the technology disclosed herein.

Figure 1:
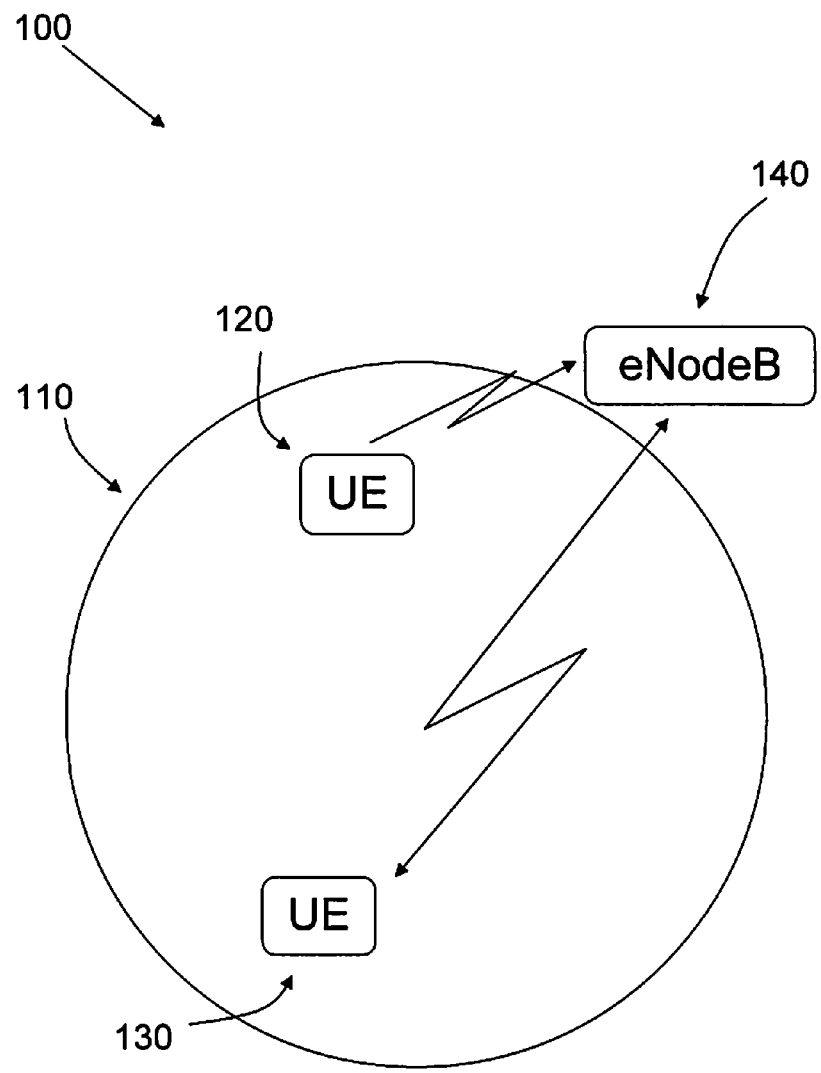
FIG. 1 shows a schematic view of a system in which the technology disclosed herein may be applied.

FIG. 1 shows an overview of a system 100 in which the technology disclosed herein can be applied. As shown, the system 100 comprises a number of cells, one of which is shown as 110 in FIG. 1. Each cell can hold a number of users, two of which are shown in FIGS. 1 as 120 and 130. The generic term for users in an LTE system is "UE", User Equipment, a term which will also be used here, and which is used in FIG. 1.

For each cell there is a controlling node, an eNodeB, 140, which controls the traffic to and from the users in the cell. Traffic from the UEs to the eNodeB is known as uplink traffic, UL traffic, and traffic in the other direction is known as downlink traffic, DL traffic.

As explained previously, in an LTE system, it is important for transmission from the different UEs in a cell to arrive simultaneously at the eNodeB of the cell. The UEs receive instructions from the eNodeB regarding when to make their UL transmissions, but as can be realized from FIG. 1, the arrival of a UL transmission at the eNodeB will depend on the distance between the eNodeB and the UE in question. For example, simultaneously made transmissions from the UEs 120 and 130 will arrive at the eNodeB 140 at different points in time, with the UL transmissions from the UE 120 arriving before those of the UE 130.

For this reason, the LTE system employs a principle known as "timing advance" of UL transmissions; the UEs are informed by the eNodeB of a "timing advance" or an "offset" which should be applied to timing instructions for UL transmissions. The timing advance for an UE is determined by the eNodeB of the cell by measurements on UL transmissions received from the UE at the eNodeB.

Figure 2:
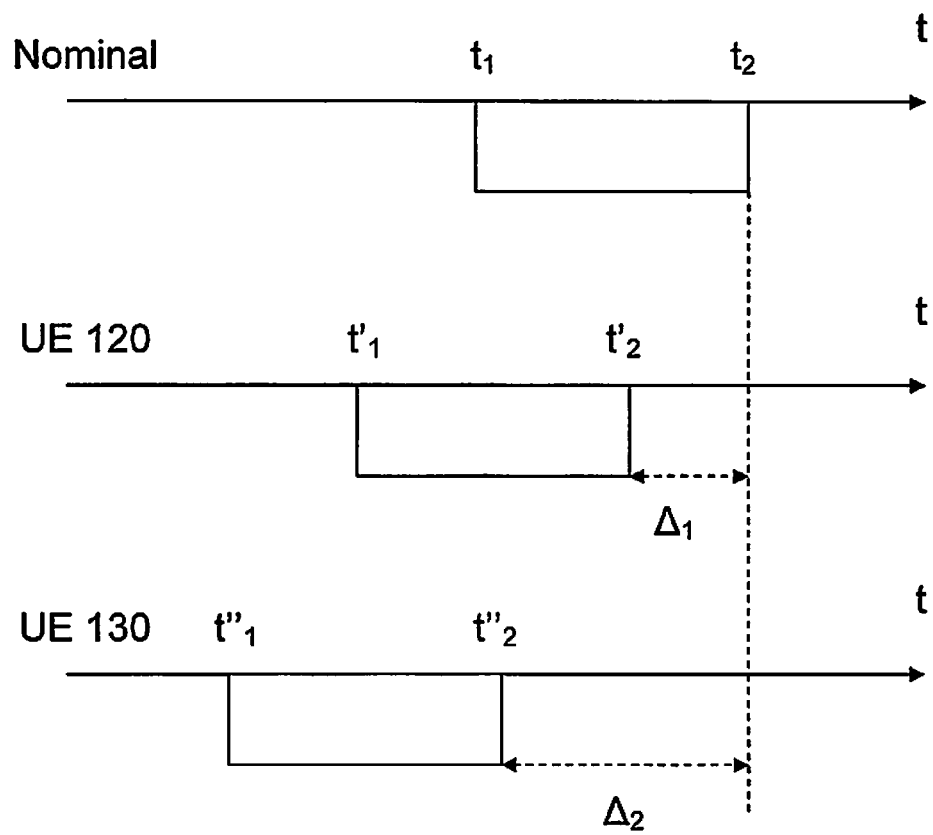
FIGS. 2 and 3 show prior art in order to illustrate a problem.

The notion of timing advance is illustrated in FIG. 2, by means of three time lines: the top time line shows a nominal window for reception of UL transmissions from the UEs in the cell 110 at the eNodeB 140. The nominal window extends between $t_1$ and $t_2$.

The middle time line shows the timing advance for the UE 120: since the UE 120 is at a certain distance from the eNodeB, the UE 120 needs to make its transmissions between $t'_1$, and $t'_2$ in order for those transmissions to arrive at the eNodeB between $t_1$ and $t_2$. This can also be viewed as displacing the UL transmission window of UE 120 by an offset in time, shown as $\Delta_1$ in FIG. 2.

The bottom time line in FIG. 2 shows the timing advance for the UE 130: since the UE 130 is quite remote from the eNodeB, the UE 130 needs to make its transmissions between $t''_1$ and $t''_2$ in order for those transmissions to arrive at the eNodeB between $t_1$ and $t_2$. This can also be viewed as displacing the UL transmission window of UE 130 by an offset in time, shown as $\Delta_2$ in FIG. 2.

The technology disclosed herein is mainly intended for the contention based Random Access (RA) procedure of E-UTRAN/LTE, which is a procedure that the UEs use in order to request/initiate communication with the eNodeB in the case that the UEs do not already have a dedicated UL resource. The RA procedure is illustrated schematically in FIG. 3, with the messages, "MSG", being numbered as follows:

MSG 1: A random access preamble transmitted by a UE to the eNodeB.

MSG 2: A random access response from the eNodeB, including a response to detected preambles, with a timing advance update, based on a measurement of message 1.

MSG 3: A scheduled transmission from the UE, based on the instructions in message 2.

MSG 4: A contention resolution message from the eNodeB, which is transmitted in order to identify the "winning" UE. This message is always transmitted, since the eNodeB is unable to determine if more than one UE has transmitted the random access message (MSG 1) at the same time with one and the same preamble.

A problem of the RA procedure is the following: more than one UE in a cell can transmit MSG 1 at the same time, and with the same preamble. In such a case, all of those UEs will perceive MSG 2 as being addressed to them, and will thus transmit MSG 3 to the eNodeB. The eNodeB will receive a plurality of MSG 3 transmissions, all of which will use the same so called UL demodulation reference signal, since the information about that signal was comprised in MSG2.

The eNodeB uses MSG 3 for UL channel estimates, and the fact that it may receive a plurality of MSG 3 transmissions with the same UL demodulation reference signal can lead to a poor UL channel estimate. Poor UL channel estimates may, in turn, lead to a need for all of the contending UEs to restart the RA procedure, with other preambles.

The technology disclosed herein is intended to address the problem of multiple contending UEs which reply to MSG 2 by transmitting MSG 3. One thought behind the technology disclosed herein is that a contending UE will compare the timing advance instruction comprised in MSG 2 with the timing advance which the UE had prior to the reception of MSG 2. If the difference is too large, it can be concluded that the MSG 2 was intended for another UE in the cell, since the timing advance instruction, also referred to as the timing alignment command, which is comprised in MSG 2 is based on measurements in the eNodeB on MSG 1, so that an overly large discrepancy between the two time advance values increases the likelihood that the value in the MSG 2 is intended for another UE.

If the difference between the two values exceeds is overly large, i.e. if the difference exceeds a certain first predefined threshold or falls below a second predefined threshold, the UE does not transmit MSG 3; instead it interrupts its current RA procedure, and randomly selects and transmits a new RA preamble, i.e. the UE re-starts the RA procedure.

Figure 3:
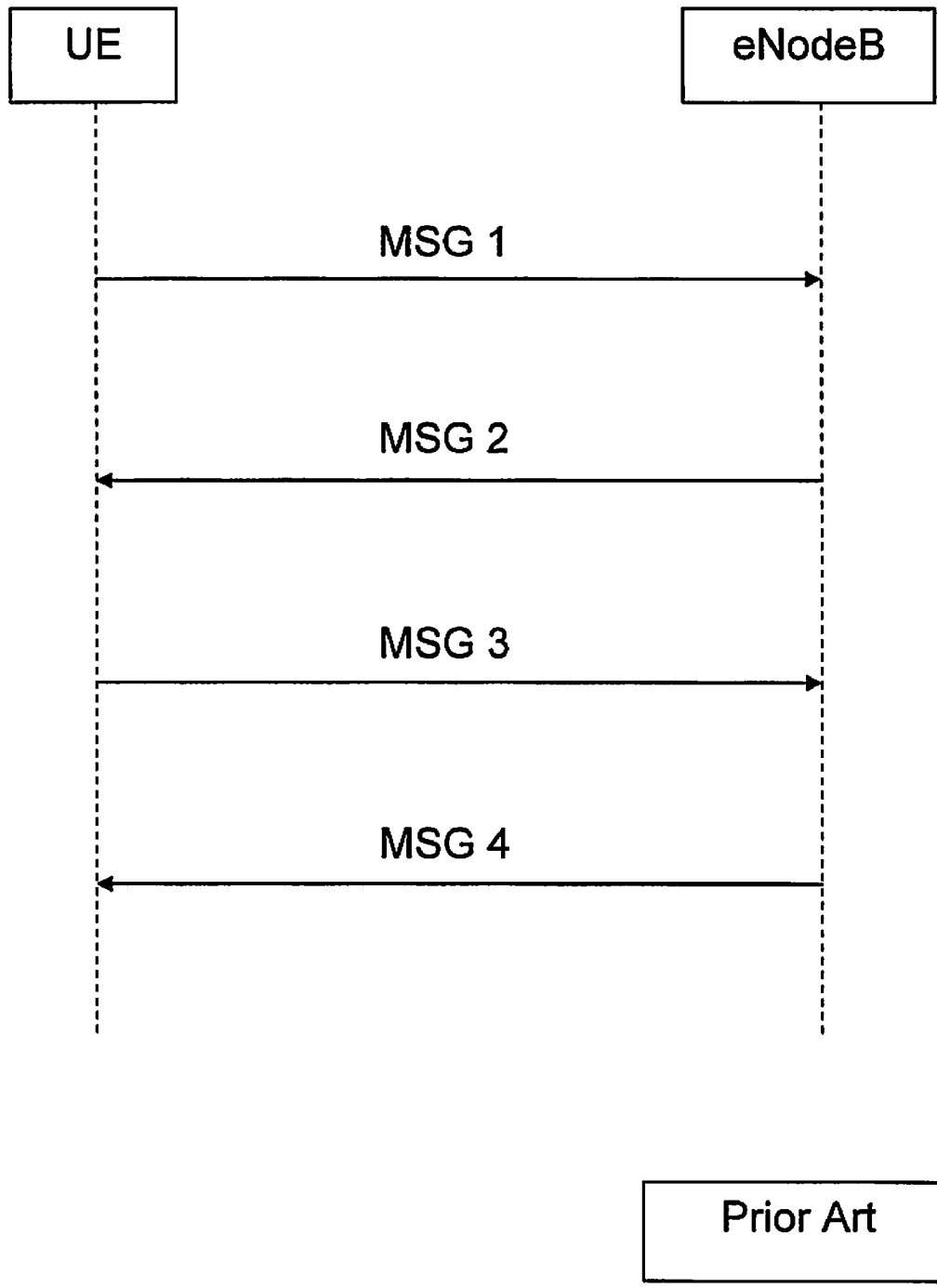
Figure 4:
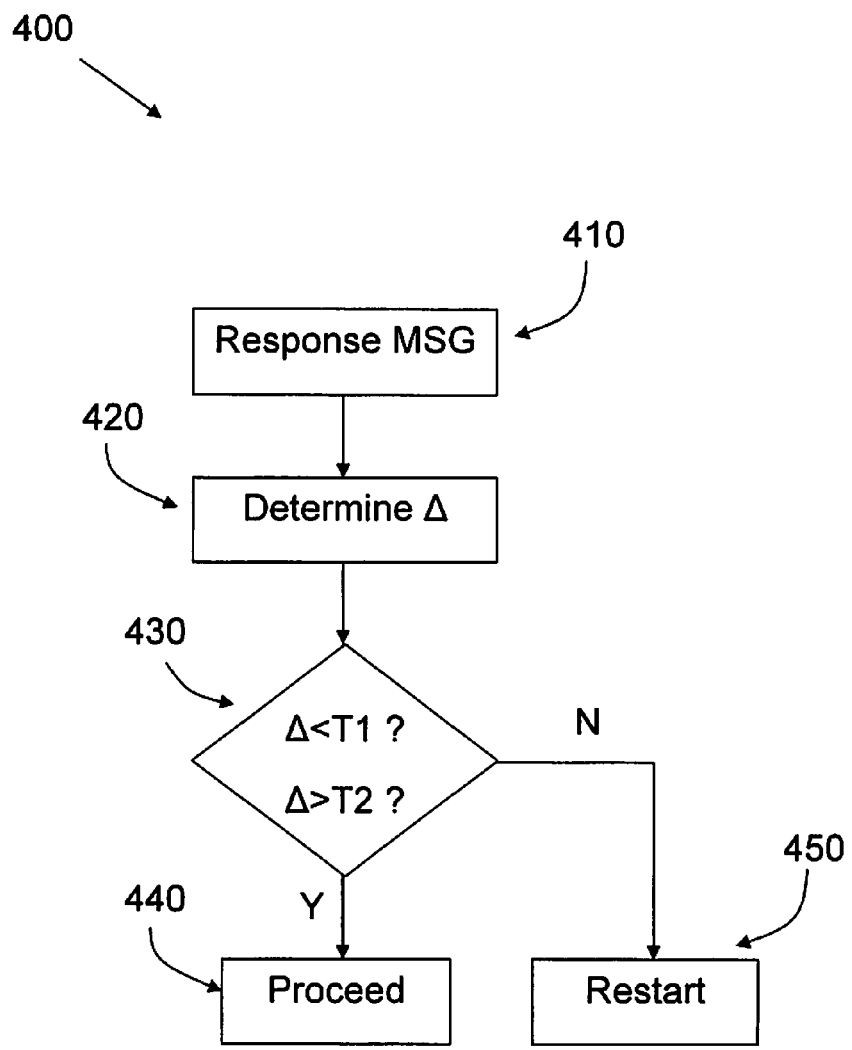
FIG. 4 shows a flow chart of a principle of the technology disclosed herein.

FIG. 4 shows a flow chart 400 of these basic steps of the technology disclosed herein: as shown in step 410, the UE will receive a response MSG, i.e. MSG 2, from the eNodeB, in response to an RA initiation message, i.e. MSG 1 of FIG. 3. Step 420 shows that the UE determines the difference between the timing advance value it had prior to the reception of the response message, MSG 2, and the timing advance value comprised in MSG 2.

As indicated in step 430, the difference, "Δ", is compared to a first threshold, "T1" and a second threshold T2; if the difference "Δ" is below the first threshold and greater than the second threshold, the UE proceeds with the RA procedure, i.e. it transmits MSG 3, step 440. Conversely, if the difference equals or exceeds the first threshold T1, or falls below the second threshold T2, the UE "restarts" the RA procedure by randomly selecting and transmitting a new RA preamble, step 450.

The thresholds, "T1" and "T2" of the flow chart 400, can be defined by the system standard or communicated from the eNodeB to the UE. In the latter case, the thresholds could either be set by the system operator or be defined as an eNodeB internal parameter by the eNodeB vendor. Alternatively, they can be set adaptively, to fit the current system environment, i.e. the average number of UEs in the cells etc.

An example of a reasonable value for the absolute value of the thresholds, "T1" and "T2", could in an LTE-system typically be in the range of 1-5 μs, since 1 82 s in round trip propagation delay corresponds to 150 m. However, this is merely an example; many other values could also be used within the scope of the technology disclosed herein, depending on system parameters such as, for example, the typical cell size and the number of users in the system or in the cells.

The manner in which the thresholds are provided to the UEs in a cell can also be varied within the scope of the technology disclosed herein. In one embodiment of the technology disclosed herein, the thresholds are provided to the LTEs by their eNodeB. In one version of this embodiment, the thresholds T are provided by the eNodeB in a system information message, such as for example a handover command message prior to handover to a new cell (110). The thresholds could be either mandatory parameters, in which case the eNodeB needs to explicitly signal the value, or the thresholds could be optional parameters, in which case default values would be applied by UEs unless a value is explicitly signalled.

Also, a system information message in which the thresholds "T1", "T2" are comprised can in one version of the technology disclosed herein be a broadcast message from an eNodeB to "its" UEs.

In another embodiment, T1 and T2 are values which are specified in the system standard, so that it they are used by all of the user terminals in the system.

In further embodiment, the values of T1 and T2 could be signalled indirectly from the NodeB to the UEs; the values of T1 and T2 could for example be defined by the magnitude of the so called cyclic prefix, which defines the maximum timing offset that can be tolerated in the uplink transmissions.

In the embodiments described hitherto, it is possible for the UEs to apply a validity timer, a so called time alignment timer, to the timing advance value which the UE has. If the timer expires before the UE received an updated value, the UE will consider the timing advance value it has to be invalid, and will consider itself to be "out of synch" with the eNodeB. In an embodiment where such a timer is used, the comparison between the timing advance values will only be carried out by a UE which has a valid timing advance value upon starting the RA procedure; if the UE has an invalid timing advance value when starting the RA procedure, the UE will accept the value comprised in MSG 2, and will proceed with the rest of the RA procedure.

In yet another version of the technology disclosed herein where the timer is used, a UE will discard the "old" timing advance value if the difference between the new and the old value, i.e. ".DELTA.", exceeds the first threshold value T1 or falls below the second threshold T2 a predefined number of random access attempts, either consecutively or within a certain amount of time. This embodiment is mainly aimed at resolving the situation where the old timing offset is inaccurate and the timing advance value from the random access response is valid, although the timer has not expired.

With respect to the issue of the thresholds T1 and T2, in one embodiment of the technology disclosed herein, the first, T1 and the second, T2, thresholds have the same absolute value, but with different signs, so that the second threshold T2 corresponds to the first threshold T1, but has a negative value.

Regarding suitable values for T1 and T2, this is a design parameter, and will also depend on the specific system and the operator of the system, but an example of a suitable range of values is ±5 μs.

Figure 5:
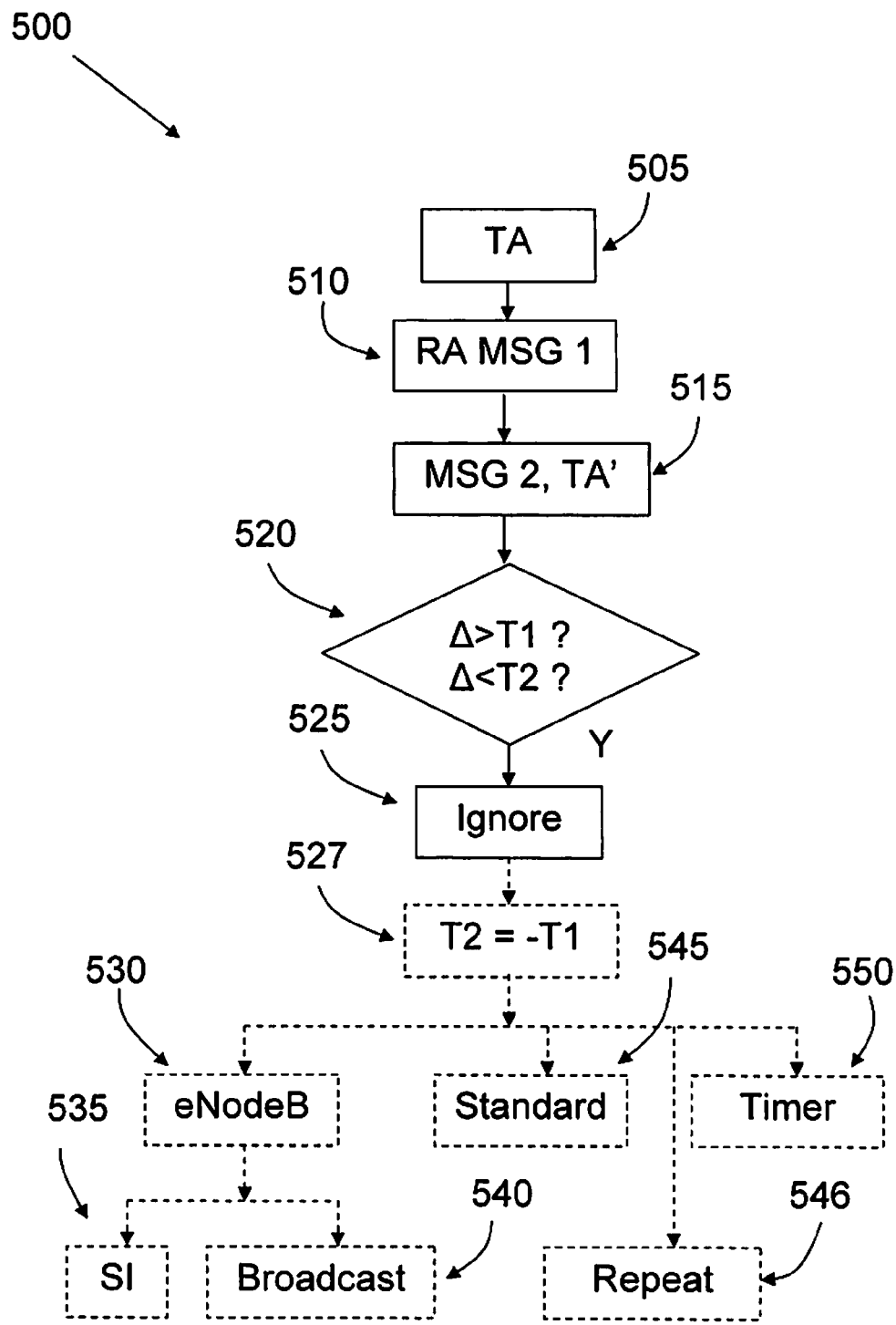
FIG. 5 shows a generalized flow chart of a method of the technology disclosed herein.

FIG. 5 shows a schematic flow chart 500 of a generalized method of the technology disclosed herein. Steps which are options or alternatives are indicated with dashed lines in FIG. 5.

As has also emerged from the description above, the inventive method 500 is intended for use in a user terminal in a cellular communications system, and according to the method, the user terminal applies a timing advance to its transmissions to a controlling node.

Also, according to the method, the user terminal may request, step 510, communication with the controlling node by means of a special message, in response to which the user terminal receives, step 515, a response message which includes an updated value for the timing advance. It can be pointed out that the term "updated" is also used here in the sense that if a UE does not have a valid timing advance value, for example if the UE has fallen out of synch, or if the UE has its first contact with the eNodeB, the value which is received is referred to as an "updated" value.

The user terminal compares, step 520, the updated value for the timing advance with the value of the timing advance that the user terminal had prior to the reception of said response message, and if the difference, "Δ", between the prior value and the updated value exceeds a certain first predetermined threshold or of it falls below a certain predefined second threshold T2, the user terminal ignores, step 525, the response message and renews its request for communication.

As shown in step 527, in one embodiment of the technology disclosed herein, the first T1 and second T2 threshold values have the same absolute value, but with differing signs, so that T2=−T1, i.e. T2 is the negative value of T1.

Step 530 shows that in one embodiment of the method 500, the thresholds T1 and T2 are provided to the user terminal by the controlling node in question. In a version of this embodiment, shown in step 535, the thresholds are provided in a system information message. As shown in step 540, the thresholds may also be provided in a broadcast message from the controlling node in question.

As indicated in step 545, in one embodiment of the technology disclosed herein, the thresholds are used by all user terminals in the system, i.e. the value is a system standard value, suitably specified by the system standard, e.g. the E-UTRAN/LTE standard.

Step 546 shows that in one embodiment of the method 500, the user terminal renews its request for communication a certain predefined number of times, and if the difference between the prior value and the updated value exceeds the first threshold or falls below the second threshold during said number of times, the user terminal will discard the prior value and use the updated value.

In a further embodiment of the method 500, which is indicated as step 550 in FIG. 5, the user terminal applies a timer to the timing advance value, so that the value is only valid for the duration of the timer, and the user terminal only makes the comparison between the timing advance values if the prior timing advance value is valid when the updated value is received, so that the updated value is accepted otherwise.

Figure 6:
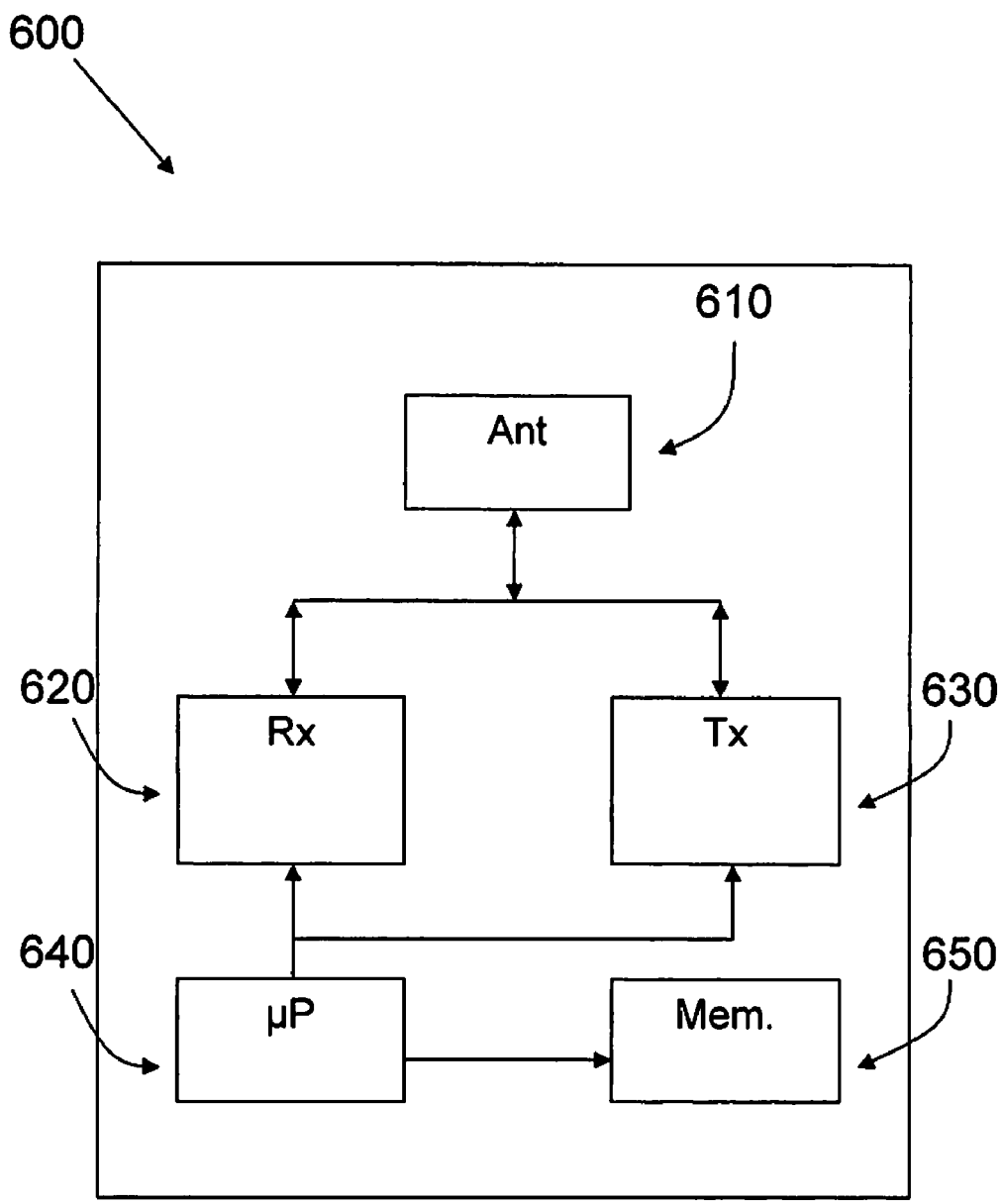
FIG. 6 shows a block diagram of a transceiver of the technology disclosed herein.

FIG. 6 shows a schematic block diagram of a transceiver 600 for use as a user terminal, a UE which functions, according to the technology disclosed herein. As indicated in FIG. 6, the transceiver 600 will comprise an antenna, shown as block 610, and will also comprise a receive part 620 and a transmit part 630. In addition, the transceiver 600 also comprises a control means 640 such as a micro processor, as well as a memory 650.

The control means 640 and the memory 650 will cooperate in order to apply a timing advance to transmissions from the transceiver 600 to a controlling node, and the control means 640 together with the transmit part 630 and the antenna 610 will be used in order to request communication with the controlling node by means of a special message.

The antenna 610, the receive part 620 and the control means 640 will be used in order to receive a response message to said special message, with the response message including an updated value for the timing advance.

In the transceiver 600, the control means 640 and the memory 650 will be used in order to compare the updated value for the timing advance with the value of the timing advance that the transceiver had prior to the reception of said response message. If the difference, Δ, between the prior value and the updated value is greater than a first predetermined threshold, T1, or below a second predetermined threshold, T2, the antenna 610, the transmit part 630, the memory 650 and the control means 640 will be used in order to ignore the response message, and for renewing the request for communication.

In one embodiment of the technology disclosed herein, transceiver will use the antenna 610 and the receive part 620 in order to receive the first and second thresholds, T1, T2, from the controlling node in question. In such an embodiment, the antenna and the receiver can also be used to receive the thresholds, T1, T2, in a system information message, or, alternatively, for receiving the thresholds, T1, T2, in a broadcast message from the controlling node in question.

In one embodiment, the transceiver 600 uses system values as the values of the thresholds, T1, T2, in which case the threshold values may be stored in the memory 650 and accessed by the control means 640.

In another embodiment, the following components may be used in order to renew the request for communication a certain predefined number of times, as well as for discarding the prior value and using the updated value if the difference between the prior value and the updated value exceeds the first threshold, T1, or falls below the second threshold, T2, during said number of times: the control means 640, the memory 650, the transmit part 630 and the antenna 610.

In a further embodiment of the transceiver 600, the memory 650 and the control means 640 may be used in order to apply a timer to the timing advance value so that the value is only valid for the duration of the timer, and in order to make the comparison if the prior timing advance value is valid when the updated value is received, so that the updated value is accepted otherwise.

The technology disclosed herein is not limited to the examples of embodiments described above and shown in the drawings, but may be freely varied within the scope of the appended claims.

The invention claimed is:

1. A method for use in a user terminal in a cellular communications system, the method comprising:
   the user terminal applying a timing advance to its transmissions to a controlling node, wherein the timing advance being an offset value in time at which the user terminal needs to start its transmission time relative to a nominal transmission time specified by the controlling node;
   the user terminal requesting communication with the controlling node by means of a special message;

in response to the special message the user terminal receiving a response message which includes an updated value for the timing advance;

the user terminal comparing the updated value for the timing advance with the value of the timing advance that the user terminal had prior to the reception of said response message, and if the difference ($\Delta$) between the prior value and the updated value is greater than a first predetermined threshold or below a second predetermined threshold, the user terminal ignoring the response message and renewing its request for communication.

2. The method of claim 1, according to which the first and the second thresholds have the same absolute value, but with different signs, so that the second threshold corresponds to the first threshold, but has a negative value.

3. The method of claim 1, according to which said first and second thresholds are provided to the user terminal by the controlling node in question.

4. The method of claim 1, according to which the thresholds are provided in a system information message.

5. The method of claim 3, according to which the thresholds are provided in a broadcast message from the controlling node in question.

6. The method of claim 1, according to which said thresholds are used by all user terminals in the system, i.e. the values are system standard values.

7. The method of claim 1, according to which the user terminal renews its request for communication a certain predefined number of times, and if the difference between the prior value and the updated value exceeds the first threshold or falls below the second threshold during said number of times, the user terminal discards the prior value and uses the updated value.

8. The method of claim 1, according to which the user terminal applies a timer to the timing advance value so that the value is only valid for the duration of the timer, and according to which method the user terminal only makes said comparison if the prior timing advance value is valid when the updated value is received, so that the updated value is accepted otherwise.

9. A transceiver for use as a user terminal in a cellular communications system, the transceiver comprising:

means for applying a timing advance to its transmissions to a controlling node, wherein the timing advance being an offset value in time at which the user terminal needs to start its transmission time relative to a nominal transmission time specified by the controlling node;

means for requesting communication with the controlling node by means of a special message;

means for receiving a response message which includes an updated value for the timing advance;

means for comparing the updated value for the timing advance with the value of the timing advance that the transceiver had prior to the reception of said response message; and means for ignoring the response message and renewing the request for communication if the difference ($\Delta$) between the prior value and the updated value is greater than a first predetermined threshold or below a second predetermined threshold.

10. The transceiver of claim 9, further comprising means for receiving said first and second thresholds from the controlling node in question.

11. The transceiver of claim 9, further comprising means for receiving the thresholds in a system information message.

12. The transceiver of claim 9, further comprising means for receiving the thresholds in a broadcast message from the controlling node in question.

13. The transceiver of claim 9, which uses system values as the values of said thresholds.

14. The transceiver of claim 9, further comprising:

means for renewing the request for communication a certain predefined number of times; and means for discarding the prior value and using the updated value if the difference between the prior value and the updated value exceeds the first threshold or falls below the second threshold during said number of times.

15. The transceiver of claim 9, further comprising:

means for applying a timer to the timing advance value so that the value is only valid for the duration of the timer; and means for making said comparison if the prior timing advance value is valid when the updated value is received, so that the updated value is accepted otherwise.

16. The method of claim 1, wherein renewing its request for communication comprises interrupting a current random access procedure and re-starting a random access procedure using a new random access preamble.

17. The terminal of claim 9, further comprising means for renewing a request for communication by interrupting a current random access procedure and re-starting a random access procedure using a new random access preamble.

18. A method of operating a user terminal in a cellular communications system, the method comprising:

receiving an updated timing advance value in a message received from a controlling node;

determining whether the message bearing the updated timing advance value is intended to the user terminal by making a comparison of the updated timing advance value with a prior timing advance value that the user terminal had prior to the reception of the message; and if the difference ($\Delta$) between the prior timing advance value and the updated timing advance value is greater than a first predetermined threshold or below a second predetermined threshold ignoring the message from the controlling node.

19. The method of claim 18, further comprising; if the difference ($\Delta$) between the prior timing advance value and the updated timing advance value is greater than the first predetermined threshold or below the second predetermined threshold, renewing request for communication with the controlling node by interrupting a current random access procedure and re-starting a random access procedure using a new random access preamble;

re-starting a random access procedure with the controlling node using a new random access preamble.

* * * * *

UNITED STATES PATENT AND TRADEMARK OFFICE
CERTIFICATE OF CORRECTION

PATENT NO. : 8,411,664 B2
APPLICATION NO. : 12/741502
DATED : April 2, 2013
INVENTOR(S) : Tynderfeldt et al.

It is certified that error appears in the above-identified patent and that said Letters Patent is hereby corrected as shown below:

On the Title Page, in Item (22), under "PCT Filed", in Column 1, Line 1, delete "Nov. 5, 2008" and insert -- Jun. 2, 2008 --, therefor.

In the Specification:

In Column 3, Line 48, delete "DRAWING" and insert -- DRAWINGS --, therefor.

In Column 6, Line 7, delete "1 82 s" and insert -- 1 μs --, therefor.

In Column 6, Line 18, delete "LTEs" and insert -- UEs --, therefor.

In Column 7, Line 64, delete "functions," and insert -- functions --, therefor.

In the Claims:

In Column 10, Line 48, in Claim 19, delete "comprising;" and insert -- comprising: --, therefor.

Signed and Sealed this
Thirteenth Day of August, 2013

Teresa Stanek Rea
*Acting Director of the United States Patent and Trademark Office*